United States Patent [19]
George et al.

[11] Patent Number: 5,696,638
[45] Date of Patent: Dec. 9, 1997

[54] DEVICE FOR DISPLAYING DATA ABOVE AN AUTOMOBILE DASHBOARD

[76] Inventors: Peter D. George, 901 Sun Deck Way, Boynton Beach, Fla. 33436; Robert E. Naser, 2001 Marina Dr., Apt. 910W, North Quincy, Mass. 02171

[21] Appl. No.: 554,284

[22] Filed: Nov. 6, 1995

[51] Int. Cl.⁶ ............................................. G02B 5/08
[52] U.S. Cl. ................................. 359/857; 359/862
[58] Field of Search ............................. 359/856, 857, 359/858, 861, 862, 402, 630, 631, 632, 633

[56] References Cited

U.S. PATENT DOCUMENTS

| 4,664,475 | 5/1987 | Ferrer | 350/174 |
| 5,390,625 | 2/1995 | Chun | 116/62.1 |

*Primary Examiner*—Paul M. Dzierzynski
*Assistant Examiner*—Mark Robinson

[57] ABSTRACT

A compact device, that a driver can attach to the edge of an automobile dashboard, displays speedometer and/or other data at a location within the windshield area.

4 Claims, 2 Drawing Sheets

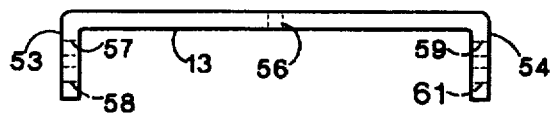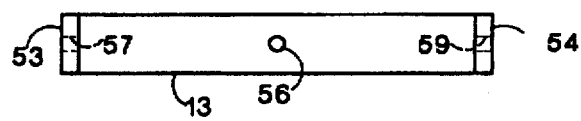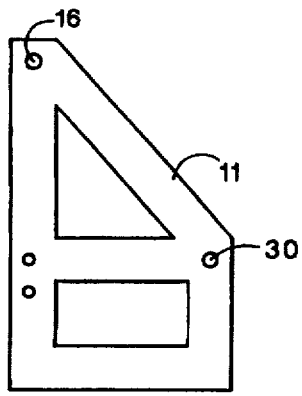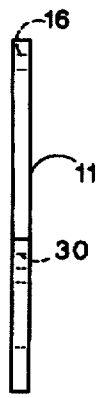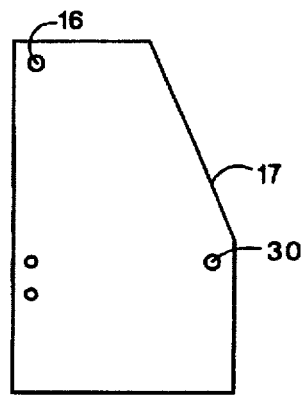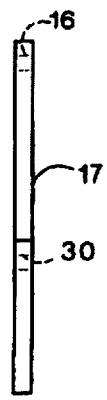
FIG.7　　FIG.8　　FIG.9　　FIG.10
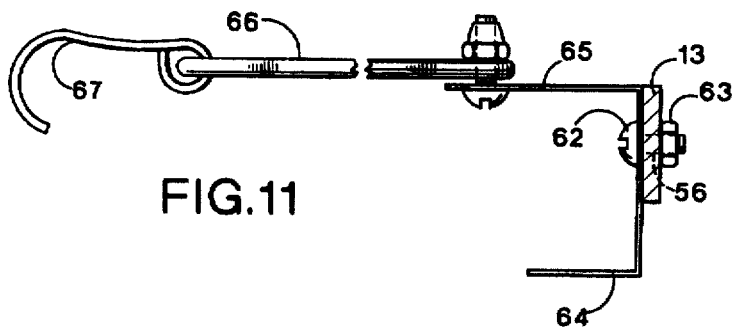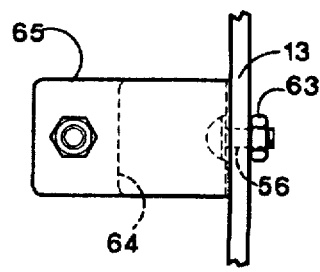
FIG.11　　　　　　　　　　FIG.12
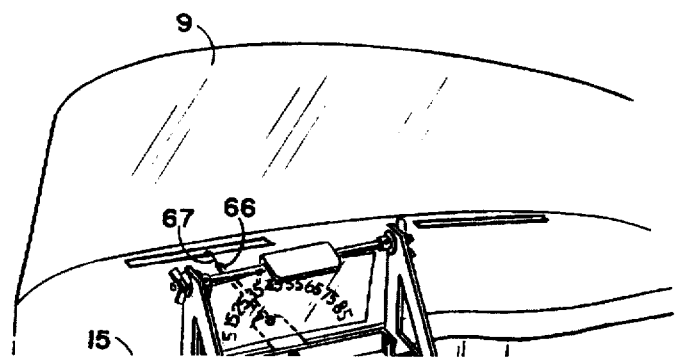

5,696,638

DEVICE FOR DISPLAYING DATA ABOVE AN AUTOMOBILE DASHBOARD

BACKGROUND OF THE INVENTION

Most automobiles have display panels below their dashboards operating data, such as car speed, gas-supply, battery charge, etc. The driver, however, necessarily keeps his attention on the scene through the windshield, above the dashboard. Momentary diversion of the driver's gaze, down to the display panel, can easily cause an accident, and we describe herein, as our invention, a device that displays the operating data above the dashboard, where it will not misdirect the driver's attention.

Other attempts to achieve this end, such as that shown in FIG. 4 of Chun U.S. Pat. No. 5,390,625 have included the placing of periscope elements that will project an image on the windshield itself.

SUMMARY OF THE INVENTION

We have invented a self-contained, unitary device that owners can readily install into cars of different makes, and remove easily to avoid theft when the car must remain left in an exposed location. This device comprises two wall-like structural members that one can position crosswise, one to the other, of an automobile, and at least one sturdy strut that supports these members.

These structural members of our device have, mounted between them, a forward display, mirror and a rearward, projection mirror, rotatable on parallel horizontal axes. The mirrors, preferably, have magnifying, slightly concave, surfaces, obtained, preferably by cutting the mirrors from 42 inch (1 m.) diameter spheres, and are, conveniently, rectangular in outline although semi-circular mirrors and mirrors having rectangular bottom portions combined with semi-circular tops also come within the scope of our invention.

Our invention includes means for releasably affixing our device to the automobile dashboard, such, for a preferred example, as tubular members mounted upon said dashboard, and rods that slidably fit these tubular members, projecting forwardly from the device, and, alternatively, the device comprises elements that can clamp under and over an edge of the dashboard, an elongated tie means affixed to said elements, such as an elastic cord, and a hook at the end of the cord that can hook onto an irregularity, such as an air vent, in the surface of the dashboard.

Our device includes means for adjusting the vertical inclinations of the mirrors, which we have bonded to rods between the structural supports. The driver can rotate these rods manually, by means of outwardly projecting finger grips. Compressing metal-rubber seals, so that their rubber portion grips the rod surface, comprises a preferred means to brake undesired rotation of the rods and mirrors. We have attached the rod, that comprises its axis of turning, close to the top of the display mirror, and the rod (and axis of turning) of the projection mirror about ⅓ the way down.

BRIEF DESCRIPTION OF THE DRAWINGS

FIG. 5 shows an edge view of the strut used in our device.

FIG. 6 shows a plan view of the strut of FIG. 5.

FIG. 7 shows a side elevation of a structural support member of the embodiment of FIG. 1.

FIG. 8 shows an edge elevation of the structural support member of FIG. 7.

FIG. 9 shows a side elevation of a structural support member of the embodiment of FIG. 2.

FIG. 10 shows an edge elevation of the structural support member of FIG. 9.

FIG. 11 shows a side view of a hook, tie, and clamp assembly for use with the embodiment of FIG. 1.

FIG. 12 shows a plan view of the clamp of FIG. 11.

FIG. 13 shows a pictorial view of our device installed on the dashboard of an automobile.

DETAILED DESCRIPTION OF PREFERRED EMBODIMENTS

Figure 1:
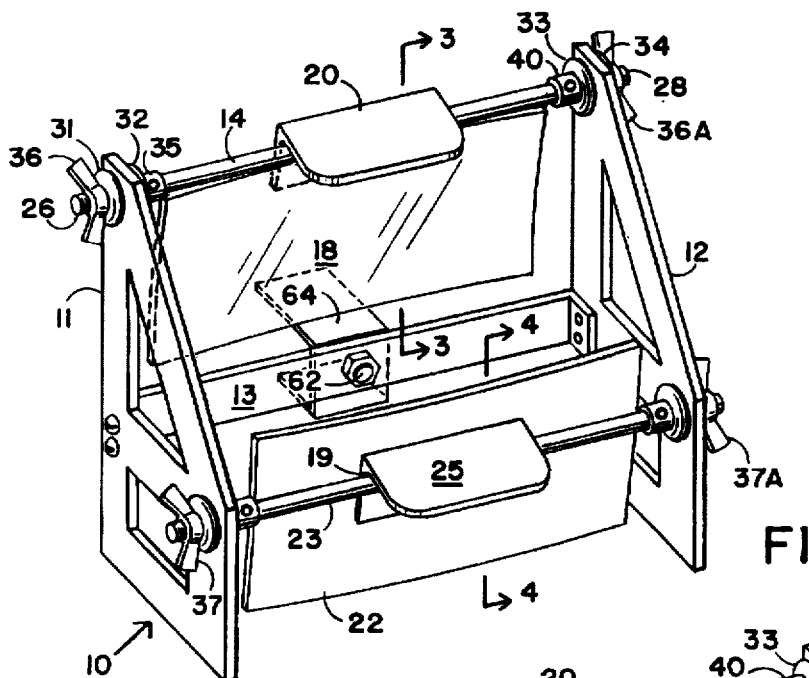
FIG. 1 shows a pictorial view of one embodiment of the device of our invention, and clamp means for fixing it to a dashboard.

Referring first to FIG. 1, our device 10 for displaying data above a dashboard 15 (see FIG. 2), and before a windshield 9 (FIG. 13), has structural support members 11, 12 held securely apart by a sturdy strut 13, see also FIGS. 5 and 6. A metal, preferably brass, rod 14, that passes through a close-fitting opening 16, in the support member 11 (and a matching opening in the support 12) supports a rectangular display mirror 18 at, or very near, its top by means of a cement, such, preferably, as silicone rubber, bonding layer 19. See also FIG. 3. The bonding layer 19 also cements the non-reflecting surface of the mirror 18 to a wide area of a finger grip 20 that also bonds to the rod 14.

The mirror 18 will function in the form of a flat plate but, in the described embodiment, it has a magnifying concave reflecting surface 21 (FIG. 3) obtained by our having had it cut from a glass sphere 42 inches (1 m.) in diameter.

A second mirror 22 supported by a rod 23, bonded thereto, faces forwardly, from a position below, and to the rear of, the mirror 18. This mirror also, although it may have a planar surface in some embodiments of our invention, in the illustrated instance has essentially the same magnifying concave spherical surface configuration as the mirror surface 21.

Figure 3:
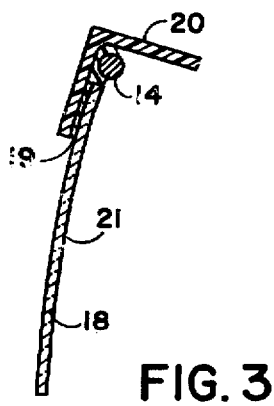
FIG. 3 shows a section through the rod, finger grip, and display mirror along the line 3—3 of FIG. 1.
Figure 4:
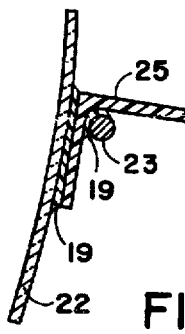
FIG. 4 shows a section of the rod, projecting mirror, and finger strip along the line 4—4 of FIG. 1.

Ends 26, 28 of the rods 14, 23 have short threaded portions that extend through holes 16 (FIG. 7) in the structural support members 11, 12. As shown in FIGS. 1 and 3 the central portion of the rod 14 adhesively supports a finger grip 20, comprising a length of plastic angle extrusion, with a layer of silicone rubber cement for bonding. Other known cements, such as epoxy may also serve within the scope of our invention. We also cement the inside surface of the finger grip 20 to the top portion of the non-reflecting surface of the display mirror 18 where it serves to support said mirror.

We have mounted another rod 23, having the same length and threading as the rod 14, through holes 30 (FIG. 7) of the structural support members 11, 12 and cemented over the rod 23 another finger grip 25 which we have also supportingly cemented to the back of the mirror 22. Note from the drawing that, while we have cemented the mirror 18 to an inner surface of the finger grip 20, we have cemented the mirror 22 to an outer surface of the finger grip 25 so that the mirrors can face each other.

To provide an adjustable frictional braking restraint against unwanted rotation of the mirrors 18, 22, we have fitted pairs of known types of metal-rubber bonded seals 31, 32; 33, 34 over the ends 26, 28, on either side of the structural support members 11, 12, with the metal portions of each seal outermost. We have also locked set-screw collars 35, 40 at the inner surfaces of the seals 32 and 33. We have applied wingnuts 36, 36A, and 37, 37A to ends of the rods 14, 23 so that turning of the wingnuts will compress the seals 31–34 against the set-screw collars 35, 40 and extrude the rubber portion of the seals against the rods for the desired degree of friction.

The strut 13 (FIGS. 5 and 6) that securely holds the structural support members 11, 12 comprises an aluminum bar with flanges 53, 54 folded back at right angles. The strut 13 has a central attachment hole 56 and pairs of holes 57, 58 and 59, 61 for bolting to the structural support members.

Figure 2:
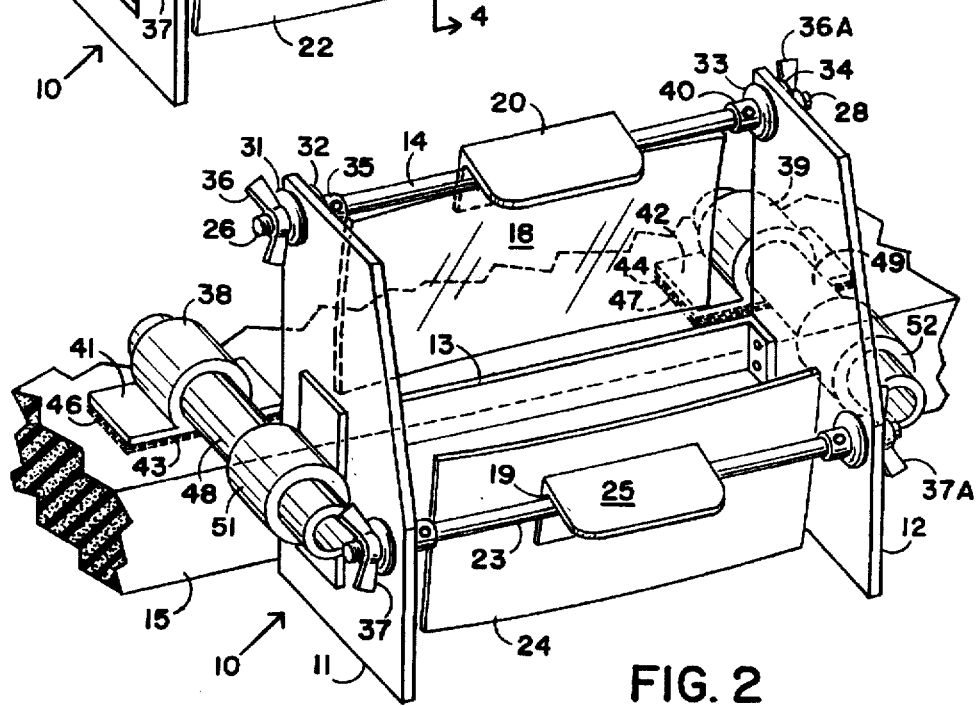
FIG. 2 shows a pictorial view of another embodiment of the device of our invention, and rigid tubing means fixing it to a dashboard.

To mount the embodiment of the device of FIG. 1 on a dashboard, such as the dashboard 15 of FIGS. 2 and 13, we have mounted engaging means, preferably comprising a sheet-metal channel 64, to the strut 13 by means of a bolt 62 through the hole 56 of the strut and secured by a nut 63. Flanges 64, 65 fit under and over the edge of the dashboard 15 and we tie a loop of elastic cord 66, preferably braided, onto the upper flange 65 of the channel 64. To the other end of the cord 66 we affix a hook 67 which the driver can fit into one of the usual air vents 68 that open at the tops of dashboards, or to a commercially known cloth-mounted ring (not shown) that one can cement to the top of the dashboard.

To mount the embodiment of FIG. 2 of our device upon the automobile dashboard 15 we provide two tubular members 38, 39 which have respective integral flat surfaces 41, 42. We bond these flat surfaces to strips 43, 44 of known hook and loop fabric such as Velcro® and bond matching strips 46, 47 of the hook and bond material to the top of the dashboard 15. Rigid hollow plastic rods 48, 49 that have a close slide fit to the tubular members 38, 39 support our device 10 against the dashboard 15 by means of cylinders 51, 52 firmly affixed to the support members 11, 12. These cylinders 51, 52 closely fit the rods 48, 49. For affixing the members 38, 39 to the dashboard we have purchased hook and loop fabric pieces, with adhesive coatings applied, from known commercial outlets.

OPERATION

Our device 10 features a unique compactness that minimizes any obstruction of the driver's view and, particularly, permits him to remove the device from danger of theft by easily dismounting it from the dashboard when the car will remain unattended. The depicted device 10 of FIG. 1, for example, has a right angled box-like shape with sides of about 2½×4×5.6 inches (6.5×10×14 cm). When we mount our device, as we have explained, at the edge of the dashboard, the driver can adjust the lower mirror 22 to face a display panel 69 (FIG. 13) under the dashboard, and adjust the upper mirror 21 to reflect the face of the mirror 22 into his own field of vision.

We have made the foregoing description exemplary, rather than definitive of our invention, for which we desire an award of Letters Patent as defined in the following claims.

We claim:

1. A self-contained, unitary device for displaying operating data of an automobile, from a location below the automobile dashboard, above said dashboard, comprising:

(A) first and second, substantially vertical wall-like, structural support members, positioned crosswise, one to the other, of said automobile, and strut means supportably spacing apart said second support members, (B) a display mirror forwardly mounted to rotate on a first horizontal axis between said first and second structural support member, and reflect rearwardly, (C) a projection mirror, rearwardly mounted to rotate on a second horizontal axis, parallel to, and lower than said first axis, and project an image onto said display mirror, (D) means mounted on said device and extending therefrom for affixing said device to the top surface of said dashboard, with said display mirror above the surface of said dashboard and said projection mirror in a driver's line of sight to a display of said operating data without turning his gaze from the direction of a said windshield, and (E) means for releaseably affixing said device to said dashboard, said affixing means comprising tubular members horizontally fixed to said dashboard lengthwise of said automobile, said device comprising supporting rod members projecting forwardly at either side thereof, said rod members fitting slidably into said tubular members.

2. The device of claim 1 comprising elements fitting under and over an edge of said dashboard engaging means affixed to said device, elongated tie means affixed to said engaging means, and hooking means, affixed to said tie means whereby a person can connect said tie means to an irregularity, such as an air vent, in said dashboard.

3. The device of claim 2 comprising rods rotatably mounted between said structural support members, means affixing said mirrors to said rods, and braking means for said rods.

4. The device of claim 3 wherein said braking means comprises metal-rubber bonded seals and for compressing said seals and thereby extruding rubber against said rods.

* * * * *